May 28, 1963 H. T. SPARROW 3,091,394
HEATING SYSTEM CONTROL WITH ANTICIPATING MEANS
Filed Dec. 12, 1960
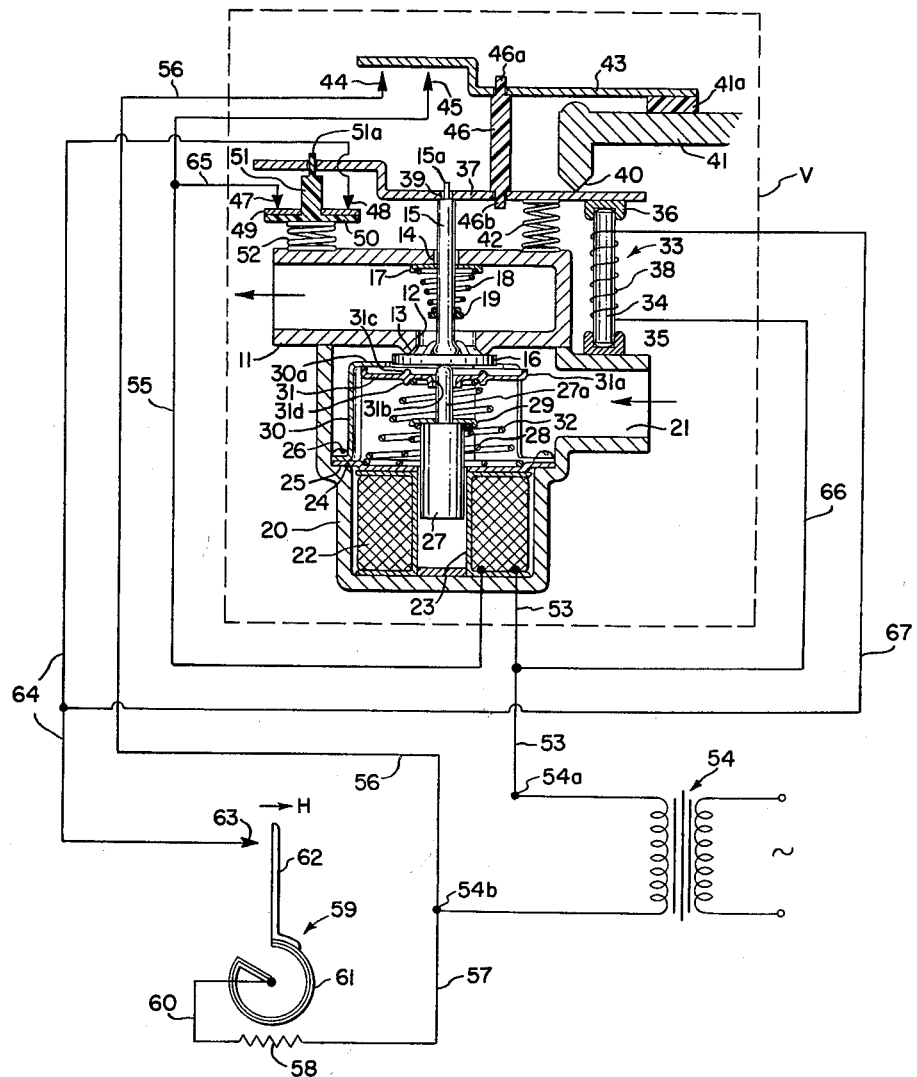
INVENTOR.
HUBERT T. SPARROW
BY
*Alan M. Staubly*
ATTORNEY United States Patent Office 3,091,394
Patented May 28, 1963

3,091,394
HEATING SYSTEM CONTROL WITH
ANTICIPATING MEANS
Hubert T. Sparrow, Edina, Minn., assignor to Minneapolis-Honeywell Regulator Company, Minneapolis, Minn., a corporation of Delaware
Filed Dec. 12, 1960, Ser. No. 75,221
13 Claims. (Cl. 236—68)

This invention relates to a system for regulating temperature in a building by controlling the heating apparatus in a manner to more closely maintain a desired temperature within the building. More particularly, the invention relates to a system which provides "de-drooping" in a system using a "heat anticipating" type of thermostat for controlling the operation of the heating apparatus.

While heat anticipating thermostats in a heating system have the advantage of providing more uniform heating of the space where a desired temperature is to be maintained, it has the inherent disadvantage of permitting a droop in the temperature as the load on the system increases. This is due to the fact that as the temperature around the thermostat decreases, it is necessary for the "on" time of the thermostat to increase. This means that a lower temperature is required at the thermostat to maintain the thermostat in its "on" position for this greater period of time.

It is one of the objects of this invention to provide means for reducing the amount of heat anticipation supplied to the room thermostat as the load on the system, controlled thereby, increases.

Another object of the invention is to provide apparatus in a heating system which will function at a predetermined load on the heating system to reduce the heat anticipation current supplied to the room thermostat to reduce the artificial heating thereof.

A still further object of the invention is to provide a combined on-off and modulating power means for a control valve wherein the modulating portion of the valve actuating mechanism embodies switching means for effecting a reduction in the heat supplied to a heat anticipating thermostat at a preselected load on the heating system.

Still further objects of the invention will become apparent upon reading the following detailed description of the invention in conjunction with the accompanying drawing wherein:

The only FIGURE of the drawing is a schematic showing of the apparatus and control system therefor, the valve apparatus being shown in cross section.

The valve of this invention comprises a valve body portion 11, having an outlet at its left-hand end, and an opening 12 intermediate its ends, which terminates at its lower end in a valve seat in the form of an annular rib 13. There is also a hole 14 through the opposite wall that is coaxial with the hole 12 and through which the stem of the valve 16 extends. The hole 14 is sealed against leakage by means of a spring retainer washer 17 that fits snugly about the stem 15 and is biased against the inner surface of the body 11 around the hole 14 by means of a compression spring 18. The other end of the compression spring bears against an annular shoulder 19 fixedly secured to the stem 15 by any suitable means (not shown). The stem 15 is secured to the valve head 16 by a conventional ball and socket connection.

A cup-shaped body portion 20 has its upper open side secured to the body portion 11 around the opening 12 by any suitable means, such as by bolts (not shown), and has an inlet 21 for conducting gas to valve seat 13 and valve head 16.

Mounted in the bottom of the cup shaped body 20 is a solenoid coil 22, surrounding a solenoid plunger tube 23. The coil is retained in the bottom of the housing 20 by means of a washer 24 which is secured to a step 25 in the body portion 20 by means of screws 26.

A solenoid plunger 27 extends partially into the tube 23 and has a stem portion 27a that extends upwardly from the upper end of the plunger into engagement with the lower surface of the valve head 16. A coiled compression spring 28 bears at its lower end against the washer 24 and at its upper end against a spring retaining washer 29 that surrounds the stem 27a with an interference fit so as to, in effect, make it integral with the stem 27a. This spring 28 normally biases the plunger outwardly of the tube with sufficient force to hold the valve disc or head 16 against the valve seat 13 by overcoming the bias of spring 18 and the weight of valve stem 15, valve head 16, and plunger 27.

Mounted on the top side of the washer 24 are three bracket members 30 which are spaced around the periphery of the washer 24. These brackets have outwardly extending flanges at their lower ends through which the screws 26 pass to hold the bracket against the washer 24 and the washer 24 against the step in the housing 20. The upper ends of the brackets 30 have inwardly extending flanges that serve as stop means for an abutment washer 31.

The abutment washer 31 has an upwardly extending flange 31a extending around the periphery thereof for engagement with the inwardly extending flange 30a of the bracket 30. The center of the washer 31 has a flanged opening 31b through which the stem 27a extends. The washer 31 also has an upwardly extending annular rib 31c that is adapted to be engaged by the valve head 16. An annular rib 31d on the lower side of the washer 31 serves as a spring retainer for the upper end of a spiral spring 32 that serves to hold the abutment washer 31 coaxial with the opening 12 and normally biases the abutment washer 31 against the flanges 30a on the bracket 30. The lower end of the spring 32 rests in a recess formed in the coil retaining washer 24.

The apparatus as thus far described provides a valve that is able to be biased to its open position by means of a spring 18 sufficiently far to engage the abutment rib 31c on the abutment washer 31, when the solenoid coil 22 is energized to pull the plunger 27 inwardly or downwardly thereof against the bias of spring 28. This moves the valve head 16 to "on" or "open" position which provides a predetermined minimum flow of gas through the valve to obtain proper ignition. The spring 18 is not sufficiently strong to compress the spring 32 to move the valve head 16 beyond this minimum flow position by lowering the abutment washer 31 away from the flanges 30a.

To provide further movement of the valve to a wider opened position, additional power means in the form of a heat motor, generally designated by the reference numeral 33, is provided. This heat motor consists of a metallic rod 34 positioned at its lower end in a socket member 35, mounted on the valve body portion 20, and at its upper end in a socket member 36, mounted on one end of a floating lever 37. A heater wire 38 is wrapped around the rod 34, with suitable electrical insulation (not shown) therebetween to cause the rod to expand in proportion to the amount of heat thrown into the rod from the same electrical source of power that energizes the coil 22. The central portion of the lever 37 has an aperture 39 therein which is coaxial with the openings 14 and 12 and has slidably extending therethrough an extension 15a of reduced diameter from the upper end of the stem 15 of the valve 16. A pivot 40 on a bracket 41 within a valve housing V engages the upper side of the lever 37 at a point spaced a short distance from the rod 34 so that a small expansion of the rod 34 will cause a much greater movement of the intermediate portion of the lever 37 to actuate the valve stem 15. A coiled compression spring 42 is positioned between the valve body portion 11 and the lever 37, between the valve stem 15 and the pivot 40, to normally bias the lever 37 in a clockwise direction against the bias of the rod 34. This spring 42 thus causes the lever 37 to follow the movement of the upper movable end of the rod 34.

Mounted on the housing bracket 41 is a block of insulation 41a and secured to this block, by any suitable means (not shown), is a flexible contact arm 43. The other end of the contact arm 43 is spaced a short distance from two fixed contacts 44 and 45 but is adapted to be lowered into engagement with the fixed contacts under the normal bias of the contact arm 43 when nothing is holding the contact arm away from the contacts. However, in the normal shutdown condition of the apparatus, a spacer pin 46, of suitable insulating material, extends between the lever 37 at a point intermediate the valve stem 15 and spring 42 to a point intermediate the ends of the contact arm 43. The spacer pin has reduced diameter extensions 46a and 46b at its opposite ends that extend through openings in the contact arm 43 and lever 37, respectively.

There is another switch associated with the left-hand end of the lever 37, as viewed in the drawing, which is normally closed but is adapted to be opened by movement of the lever 37 in the same direction that causes closing of the contacts 44 and 45. This switch comprises two fixed contacts 47 and 48 that are bridged by a washer-shaped contact bar 49. The bar 49 is carried by an insulation disc 50 having an upwardly extending stem portion 51 that is adapted to be engaged by the lever 37. Stem 51 has an extension 51a of reduced diameter that extends through an opening in the lever 37 for guide purposes. A compression spring 52 normally biases the contact bar 49 into engagement with the fixed contacts 47 and 48. It is to be noted that the space between the lower side of the lever 37 and the top of the stem 51 is slightly greater than the distance between the lower side of the contact arm 43 and the fixed contacts 44 and 45. With this arrangement, the contacts 44 and 45 will be bridged prior to the contact bar 49 breaking the circuit between the contacts 47 and 48 as the lever 37 moves downwardly. By having the extension 46a on the spacer 46 slidable in the hole in the contact arm 43, the lever 37 may move away from the contact arm 43 after the contacts 44 and 45 have been bridged to break the contacts 47, 48, and open the valve 16 to a wider opened position. The calibrations of these switches are such that the two switches make and break with only a slight differential in movement of the lever 37 and at a point wherein the valve 16 is at some predetermined percentage of its wide open flow position.

One end of the coil 22 is connected through lead line 53 to one side 54a of the secondary of transformer 54 while the other end of the coil is connected through lead line 55 to fixed contact 45. The other fixed contact 44 is connected through lead line 56 to the other side 54b of the secondary of the transformer. A line 57 also extends from 54b of the secondary to one end of a heater 58 of a room thermostat 59. The other end of the heater 58 is connected through a wire 60 to one end of a bimetallic strip 61. The other end of the bimetallic strip 61 is connected to a contact arm 62 which is movable into and out of engagement with a fixed contact 63. The fixed contact 63 is connected through lead line 64 to fixed contact 48. The other fixed contact 47 is connected through lead line 65 to lead line 55. Since line 55 is connected to the coil of the solenoid, the solenoid is connected to the other terminal 54b of the transformer secondary through the contacts 47 and 48 and thermostat 59. This places the room thermostat in control of the energization of the solenoid valve actuating means.

One end of the heater 38 of the heat motor 33 is connected by a lead line 66 to lead line 53 while the other end of the heater wire 38 is connected by lead line 67 to lead line 64. It is therefore obvious that the thermostat also controls the energization of the heat motor 33.

*Operation*

Assuming that the inlet 21 of the gas valve is connected to a source of fuel gas and the outlet of the valve is connected to a furnace of a heating installation, the elements of the system and apparatus are shown in the position they would be in with the space surrounding the thermostat 59 in a satisfied condition.

Now assuming that the temperature around the thermostat 59 should lower sufficiently to cause the bimetal 61 to actuate the contact arm 62 into engagement with the fixed contact 63, current will flow from the lower end of the secondary of transformer 54 from 54b, through line 57, heater 58, line 60, bimetal 61, contact arm 62, fixed contact 63, line 64, fixed contact 48, contact washer 49, fixed contact 47, line 65, line 55, coil 22, and line 53 to the upper end 54a of the secondary of the transformer. Current will also flow from line 64 through a branch line 67 through the heater 38 of heat motor 33 and branch line 66 to line 53, to simultaneously energize the heat motor 33.

Energization of the solenoid coil 22 will cause the solenoid plunger 27 to be drawn inwardly of the tube 23 and to free valve head 16 to move under the bias of spring 18 into engagement with the abutment ring 31c on abutment washer 31. In this position of the valve 16, gas will flow at a predetermined minimum rate to the furnace where it will be ignited by suitable ignition means (not shown).

Now assuming that the thermostat has an operating differential of 2° and that the heater 58 is capable of artificially heating the thermostat 4°, if the temperature in the room should drop 2° below the control temperature to cause the arm 62 to engage fixed contact 63, the valve 16 may be open as little as a minute or two at this minimum flow rate before the heater 58 artificially heats the thermostat 2° to cause breaking of the thermostat contacts without the heating plant actually raising the room temperature more than a fraction of a degree. If there were actually no temperature rise, due to the shortness of time that the thermostat contacts were closed, upon the bimetal cooling down to the ambient temperature, another operating cycle would occur. The furnace will thus continue to come on and off until either the room temperature rises sufficiently to prevent the closing of the room thermostat contacts or until the ambient temperature drops sufficiently far that even the heater of the thermostat is not sufficient to heat the bimetal sufficiently to break the thermostat contacts. In between the "off" and "constantly on" conditions of the room thermostat, the thermostat will cycle more or less frequently depending upon the load on the heating system, and the "on" time of the thermostat will become gradually longer as the load increases.

In order to make it unnecessary for the room temperature to drop sufficiently far below the control point of the room thermostat to cause the furnace to be on substantially constantly, as when it is extremely cold outdoors, the present system provides means for decreasing the amount of electrical current supplied to the heater of the room thermostat when the load on the heating system reaches some desired and preset percent of the maximum heating capacity of the system. This is accomplished by calibrating the switch arm 43 so as to engage fixed contacts 44 and 45 when the valve 16 has been moved to a position to supply gas to the furnace in an amount approximating 40 to 50 percent or any other selected amount of its maximum capacity. The closing of contacts 44 and 45 by arm 43 causes the solenoid coil 22 to be energized directly from the secondary of the transformer without the current to the coil having to flow through the room thermostat heater 58. So that not even a small fraction of the current to the coil 22 flows through the room thermostat, contacts 47 and 48 are broken by the bridging washer 49 leaving these contacts shortly after the making of the contacts 44 and 45.

This actuation of the contacts is a result of the room thermostat being cycled more frequently so as to develop and store a sufficient amount of heat in the heat motor 33 to actuate the valve 16 against the bias of spring 32 to a higher capacity or flow position. Therefore, with less heat being thrown into the room thermostat, the furnace will have to remain "on" for a longer period of time to combine with the heat produced by the furnace to raise the room thermostat temperature sufficiently high to break its contacts.

The action is such that on light loads the valve will cycle "on" and "off" at a rather rapid rate and at a level or firing rate only sufficient to assure satisfactory ignition without "flash back" into the manifold or without "roll out" because of excess gas.

As the load increases and the thermostat cycles gradually become such that the "on" periods become longer and the "off" periods become shorter, the heat motor will gradually assume an average position which will cause contacts 44 and 45 to make and contacts 47 and 48 to break. This action causes the system to "lock on" to "position-modulation" at some predetermined firing rate because of the restriction in heat to the thermostat heater 58 which causes, at the transfer point of "on-off" to "position-modulation," a long thermostat "on" period which will cause heat motor 38 to have a "step function" in its position in the direction which will assure that contacts 47 and 48 will not be made until the temperature in the space is raised to a point higher than the amount of artificial heat removed from the thermostat heater 58 when heater 58 no longer carries the current to coil 22.

With a reduction in artificial heat to the thermostat heater, there is a corresponding reduction in the "droop" of the system. This will result in more comfortable temperatures, as the full load control point is maintained at a higher level than would otherwise be the case.

As it is apparent that slight modifications may be made in the system without departing from the spirit of the invention, it is to be understood that the scope of the invention is to be determined from the appended claims.

I claim:

1. A control system comprising a power source; regulating means for controlly the supply of energy to a space to maintain said space at a predetermined condition; first power means for actuating said regulating means to a position to supply a minimum amount of energy to said space; second power means arranged to also actuate said regulating means between a plurality of additional operating positions including said minimum supply position, an intermediate position and a full on position; condition responsive means for sensing the condition of said space and movable between "satisfied" and "unsatisfied" positions; third power means for artificially affecting said sensing means to cause it to move towards its satisfied position when said third power means is energized; all three of said power means being arranged to be first energized when said sensing means moves to its unsatisfied position; control means operable by said second power means when said regulating means reaches said intermediate position to first directly connect said first power means with said power source and then disconnect said first power means from said condition responsive means, to thereby reduce the power flowing through said third power means and thus reduce the effect it has on said condition responsive means.

2. A control system for fuel burning apparatus comprising a power source; valve means for controlling the flow of fuel; first power means for actuating said valve means to a position to supply a minimum amount of fuel for ignition purposes; second power means arranged to also actuate said valve means between a plurality of additional operating positions including said minimum flow position, an intermediate position and a full on position; condition responsive means for sensing the condition of said space and movable between "satisfied" and "unsatisfied" positions; third power means for artificially affecting said sensing means to cause it to move towards its satisfied position when said third power means is energized; all three of said power means being arranged to be first energized when said sensing means moves to its unsatisfied position; control means operable by said second power means when said valve means reaches said intermediate position to first directly connect said first power means with said power source and then disconnect said first power means from said condition responsive means, to thereby reduce the power flowing through said third power means and thus reduce the effect it has on said condition responsive means.

3. In a heating system the combination comprising a power source; regulating means for controlling the supply of energy to a space to maintain said space at a predetermined condition; a solenoid for actuating said regulating means to a position to supply a minimum amount of energy to said space; modulating power means arranged to also actuate said regulating means between a plurality of additional operating positions including said minimum supply position, an intermediate position and a full on position; condition responsive means for sensing the condition of said space and movable between "satisfied" and "unsatisfied" positions; heater means for artificially affecting said sensing means to cause it to move towards its satisfied position when said heater means is energized; all three of the power consuming means being arranged to be first energized when said sensing means moves to its unsatisfied position; control means operable by said modulating power means when said regulating means reaches said intermediate position to first directly connect said solenoid with said power source and then disconnect said solenoid from said condition responsive means, to thereby reduce the power flowing through said heater means and thus reduce the effect it has on said condition responsive means.

4. A control system comprising a power source; regulating means for controlling the supply of energy to a space to maintain said space at a predetermined condition; first power means for actuating said regulating means to a position to supply a minimum amount of energy to said space; second power means including a heat motor arranged to also actuate said regulating means between a plurality of additional operating positions including said minimum supply position, an intermediate position and a full on position; condition responsive means for sensing the condition of said space and movable between "satisfied" and "unsatisfied" positions; third power means for artificially affecting said sensing means to cause it to move towards its satisfied position when said third power means is energized; all three of said power means being arranged to be first energized when said sensing means moves to its unsatisfied position; control means operable by said second power means when said regulating means reaches said intermediate position to first directly connect said first power means with said power source and then disconnect said first power means from said condition responsive means, to thereby reduce the power flowing through said third power means and thus reduce the effect it has on said condition responsive means.

5. A control device comprising an energy flow control means movable between "off," "minimum flow," and a plurality of further "on" positions; first power means for moving said energy flow control means to said "minimum flow" position; second power means for modulating said energy flow control means between said "on" positions; first power conveying means adapted to simultaneously transmit power to said first and second power means;

second power conveying means adapted to transmit power to said first and second power means each independently of the other; and means operable by said second power means when said energy flow control means moves through one of said "on" positions, to selectively render either said first or said second power conveying means operative.

6. A control device, for use with a condition responsive means having means for artificially satisfying said condition, comprising an energy flow control means movable between "off," "minimum flow," and a plurality of further "on" positions; first power means for moving said energy flow control means to said "minimum flow" position; second power means for modulating said energy flow control means between said "on" positions; first power conveying means adapted to connect said first and second power means to a power source through the condition responsive means; second power conveying means adapted to connect said first power means directly to the power source and to connect said second power means to the power source through the condition responsive means; and means operable by said second power means when said energy flow control means moves through one of said "on" positions, to selectively render either said first or said second power conveying means operative.

7. A control device comprising a valve movable between "off," "minimum flow," and a plurality of further "open" positions; first power means for moving said valve to said "minimum flow" position; second power means for modulating said valve between said "open" positions; first power conveying means adapted to connect said first and second power means to a power source through a control means; second power conveying means adapted to connect said first power means directly to the power source and to connect said second power means to the power source through the control means; and means operable by said second power means when said valve moves through one of said "open" positions, to selectively render either said first or said second power conveying means operative.

8. A control device, for use with a "heat anticipating" type of thermostat, comprising a valve movable between "off," "minimum flow," and a plurality of further "on" positions; first power means for moving said valve to said "minimum flow" position; second power means for modulating said valve between said "on" positions; first power conveying means adapted to connect said first and second power means to a power source through the thermostat; second power conveying means adapted to connect said first power means directly to the power source and to connect said second power means to the power source through the thermostat; and means operable by said second power means when said valve moves through one of said "on" positions, to selectively render either said first or said second power conveying means operative.

9. A control device, for use with a "heat anticipating" type of thermostat, comprising a valve movable between "off," "minimum flow," and a plurality of further "open" positions; first power means for moving said valve to said minimum flow" position; second power means for modulating said valve between said "open" positions; first power conveying means adapted to initially connect said first and second power means to a power source through the thermostat; second power conveying means adapted to connect said first power means directly to the power source and to connect said second power means to the power source through the thermostat; and means operable by said second power means when said valve is opened from said "minimum flow" position past one of said "open" positions to another "open" position to render said second power conveying means operative and to render said first power conveying means inoperative, and operable by said second power means when said valve is returned to said one of said "open" positions to again render said first power conveying means operative, and to render said second power conveying means inoperative.

10. A control device comprising an energy flow control means movable between "off," "minimum flow," and a plurality of further "on" positions; first power means for moving said control means to said "minimum flow" position; second power means for modulating said control means between said "on" positions; first power conveying means adapted to simultaneously transmit power to said first and second power means; second power conveying means adapted to transmit power to said first and second power means each independently of the other; and means operable by said second power means when said control means moves through one of said "on" positions, to selectively render either said first or said second power conveying means operative.

11. In a control device for use with a "heat anticipating" type of thermostat, the combination comprising a valve movable between "off," "minimum flow" and a plurality of other "on" positions; first, second, and third wires leading into said control device; first electric power means for moving said valve to said "minimum flow" position and connected to the first of said wires and adapted to be selectively connected to one or the other of said other wires; second electric power means for moving said valve further open and connected to said first wire and to the second of said wires; switch means operably by said second power means when said valve is moved through a preselected "on" position, to selectively connect said first power means to one or the other of said second and third wires.

12. A control device for use with a "heat anticipating" type of thermostat and comprising a valve movable between "off," "minimum flow" and other "on" positions; first electric power means for moving said valve to said "minimum flow" position; second electric power means for moving said valve between a plurality of further open positions; said first and second electric power means being electrically connected at one side each thereof to a first wire; the other side of said second electric power means being connected to a second wire; switch means operable by said valve as it moves through a preselected open position to selectively connect the other side of said first electric power means to either said second wire or to a third wire.

13. A control system comprising a "heat anticipating" type of thermostat; a valve movable between "off," "minimum flow" and other "on" positions; first electric power means for moving said valve to said "minimum flow" position; second electric power means for variably moving said valve further open; said first and second power means having a side thereof connected to one side of a power source; switch means normally connecting said first and second power means in parallel and operable by said second power means when said valve moves through a preselected "on" position to directly connect said first power means to a power source and then to disconnect said first power means from the thermostat, said thermostat being connected to the other side of said power source.

References Cited in the file of this patent
UNITED STATES PATENTS 2,282,180    Gille                  May 5, 1942
2,308,555    Tate                   Jan. 19, 1943